(12) United States Patent
Wang

(10) Patent No.: US 11,377,025 B2
(45) Date of Patent: Jul. 5, 2022

(54) BLOCKED INFORMATION DISPLAYING METHOD AND SYSTEM FOR USE IN AUTONOMOUS VEHICLE

(71) Applicant: BAIDU ONLINE NETWORK TECHNOLOGY (BEIJING) CO., LTD., Beijing (CN)

(72) Inventor: Ya Wang, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 391 days.

(21) Appl. No.: 16/682,886

(22) Filed: Nov. 13, 2019

(65) Prior Publication Data

US 2020/0148102 A1  May 14, 2020

(30) Foreign Application Priority Data

Nov. 13, 2018 (CN) .......................... 201811343909.1

(51) Int. Cl.
*B60Q 1/50* (2006.01)
*B60R 11/02* (2006.01)
(Continued)

(52) U.S. Cl.
CPC .......... *B60Q 1/503* (2013.01); *B60R 11/0229* (2013.01); *B60R 11/04* (2013.01);
(Continued)

(58) Field of Classification Search
None
See application file for complete search history.

(56) References Cited

U.S. PATENT DOCUMENTS 10,272,830 B2 * 4/2019 Suzuki .................. G08G 1/005
10,620,638 B2 * 4/2020 Budihal ............... G01S 7/4817
(Continued)

FOREIGN PATENT DOCUMENTS

CN  102855764 A  1/2013
CN  204821061 U  12/2015
(Continued)

OTHER PUBLICATIONS

Extended European Search Report corresponding to European Application No. 19208309.5 dated Apr. 7, 2020.

*Primary Examiner* — Reza Aghevli
(74) *Attorney, Agent, or Firm* — Lando & Anastasi, LLP

(57) ABSTRACT

The present disclosure provides a blocked information displaying method and system for use in an autonomous vehicle. The method comprises obtaining information about a road ahead the autonomous vehicle and information about a rear vehicle; determining road information blocked by the autonomous vehicle, according to a positional relationship between the autonomous vehicle and the rear vehicle; displaying the road information blocked by the autonomous vehicle to the rear vehicle. The present disclosure is used to solve problems in the prior art that the autonomous vehicle blocks road surface information and causes limitation to the field of vision of the rear vehicle, and that real-time display of the images of the road ahead the autonomous vehicle is prone to cause confusion, and can effectively improve the safety of the travel of the rear vehicle.

16 Claims, 2 Drawing Sheets

(51) Int. Cl.
  *B60R 11/04*   (2006.01)
  *G05D 1/00*   (2006.01)
  *G05D 1/02*   (2020.01)
  *G06V 20/58*   (2022.01)
  *G01S 17/931*   (2020.01)
  *G01S 17/86*   (2020.01)
  *G06F 3/04817*   (2022.01)
  *H04N 5/225*   (2006.01)
  *H04N 5/247*   (2006.01)
  *G06V 20/20*   (2022.01)
  *B60R 11/00*   (2006.01)

(52) U.S. Cl.
  CPC ......... *G05D 1/0088* (2013.01); *G05D 1/0246* (2013.01); *G06F 3/04817* (2013.01); *G06V 20/20* (2022.01); *G06V 20/58* (2022.01); *G06V 20/582* (2022.01); *H04N 5/2253* (2013.01); *H04N 5/247* (2013.01); *B60R 2011/004* (2013.01); *B60R 2300/105* (2013.01); *B60R 2300/50* (2013.01); *G01S 17/86* (2020.01); *G01S 17/931* (2020.01); *G05D 2201/0213* (2013.01)

(56) References Cited

U.S. PATENT DOCUMENTS

| | | | |
|---|---|---|---|
| 2004/0226204 | A1 | 11/2004 | Green |
| 2007/0115138 | A1 | 5/2007 | Arakawa |
| 2009/0299857 | A1* | 12/2009 | Brubaker ........... G06Q 30/0247 705/14.66 |
| 2015/0266421 | A1* | 9/2015 | Brubaker ................. B60R 1/00 348/148 |
| 2015/0266472 | A1* | 9/2015 | Ferguson ............... G08G 1/166 701/23 |
| 2017/0038775 | A1* | 2/2017 | Park .................... B60W 10/06 |
| 2017/0200330 | A1* | 7/2017 | Gupta ................. G05D 1/0088 |
| 2017/0262710 | A1* | 9/2017 | Kozu .................... B60K 37/00 |
| 2018/0173237 | A1* | 6/2018 | Reiley ................. G05D 1/0061 |
| 2019/0050652 | A1* | 2/2019 | Baker ................... B60W 40/09 |
| 2019/0051172 | A1* | 2/2019 | Stenneth ............... G08G 1/0141 |
| 2019/0250631 | A1* | 8/2019 | Nariyambut Murali ..................... B60W 30/00 |
| 2019/0327415 | A1* | 10/2019 | Prabhakar ............... B60R 1/002 |
| 2019/0355178 | A1* | 11/2019 | Hermina Martinez ..................... H04N 7/142 |
| 2020/0039427 | A1* | 2/2020 | Chen ....................... B60Q 1/50 |
| 2020/0070717 | A1* | 3/2020 | Garden ................ G06Q 20/202 |
| 2020/0074847 | A1* | 3/2020 | Wang .................... B60Q 1/503 |
| 2020/0166924 | A1* | 5/2020 | Pedersen ............. G05D 1/0027 |
| 2020/0173625 | A1* | 6/2020 | Meier .................... B60R 11/04 |
| 2020/0331407 | A1* | 10/2020 | Cao ........................ H04N 5/2252 |
| 2020/0331496 | A1* | 10/2020 | Cao ........................ B60R 11/04 |
| 2020/0410850 | A1* | 12/2020 | Liu ..................... G08G 1/0133 |
| 2021/0046864 | A1* | 2/2021 | Elgrably ................. B60Q 1/302 |
| 2021/0268964 | A1* | 9/2021 | Tihanyi ................. G08G 1/167 |
| 2021/0300262 | A1* | 9/2021 | Pomparew ............. B60R 11/04 |

FOREIGN PATENT DOCUMENTS

| | | |
|---|---|---|
| CN | 106408976 A | 2/2017 |
| CN | 107554430 A | 1/2018 |
| CN | 207737198 U | 8/2018 |
| CN | 108621946 A | 10/2018 |
| CN | 108766002 A | 11/2018 |
| DE | 102012018556 A1 | 3/2014 |
| DE | 102013006097 A1 | 10/2014 |
| GB | 2519370 A | 4/2015 |
| JP | 2013-206303 A | 10/2013 |

* cited by examiner

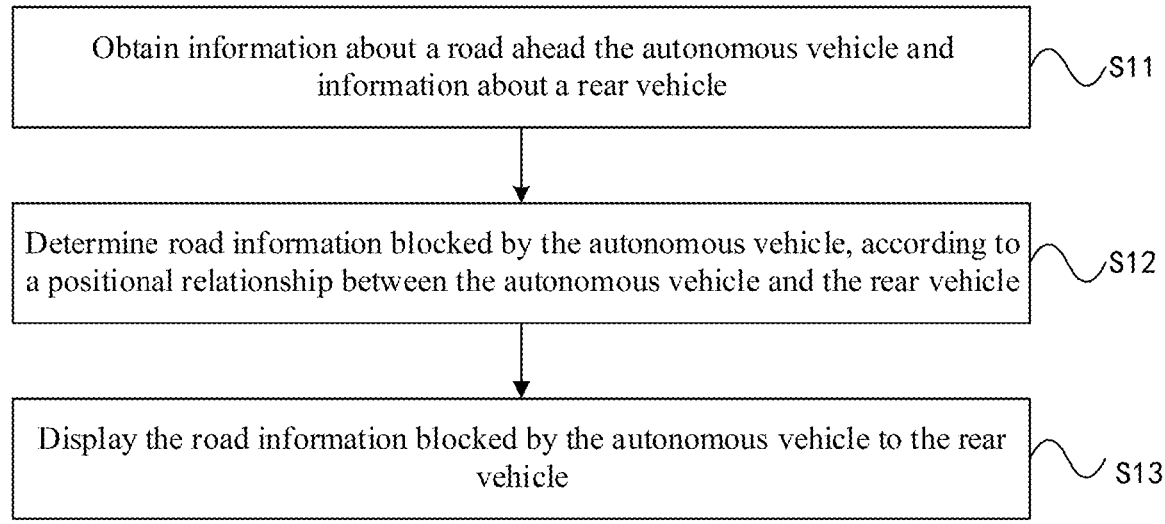
Fig. #1
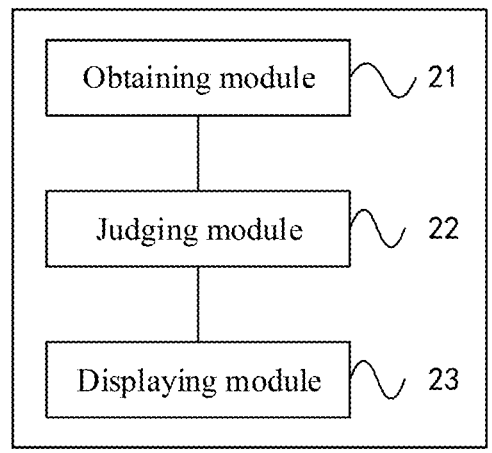
Fig. #2

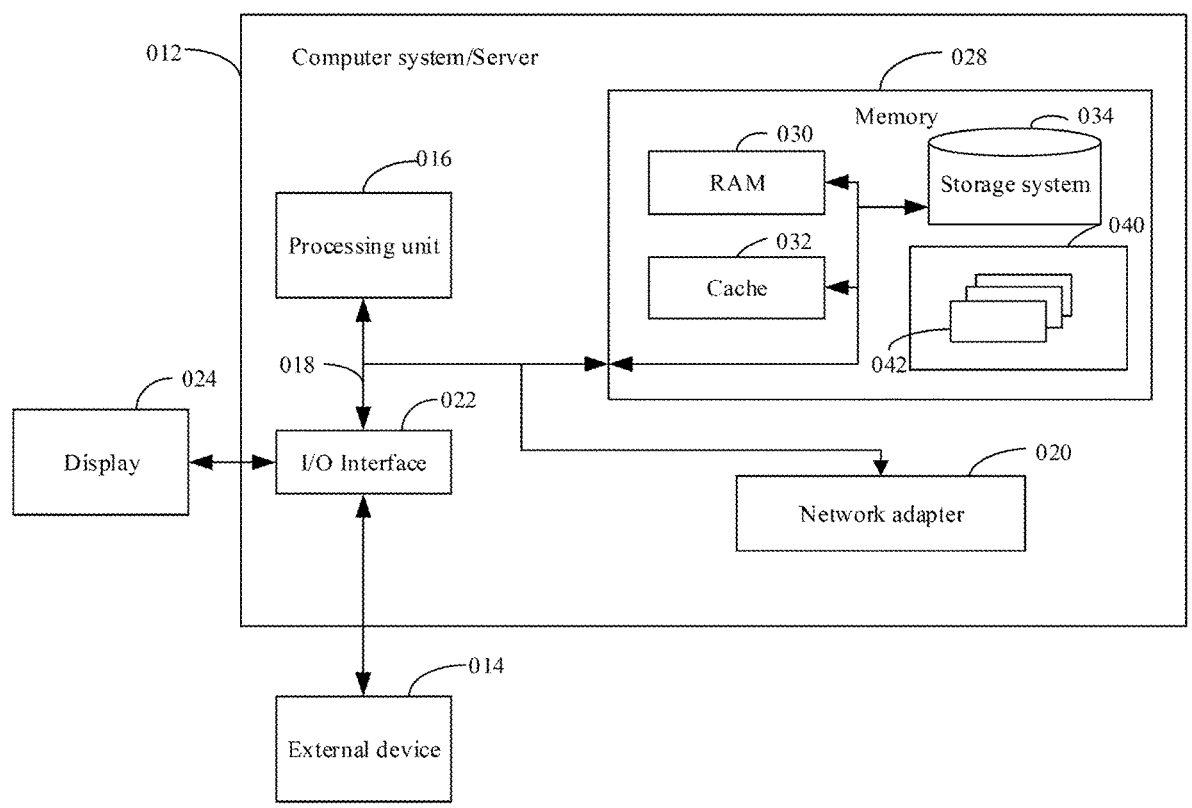
*Fig. #3*

BLOCKED INFORMATION DISPLAYING METHOD AND SYSTEM FOR USE IN AUTONOMOUS VEHICLE

CROSS-REFERENCE TO RELATED APPLICATION(S)

The present application claims the priority of Chinese Patent Application No. 201811343909.1, filed on Nov. 13, 2018, with the title of "Blocked information displaying method and system for use in autonomous vehicle". The disclosure of the above applications is incorporated herein by reference in its entirety.

BACKGROUND

Technical Field

The present disclosure relates to the field of automatic control, and particularly to a blocked information displaying method and system for use in an autonomous vehicle.

Description of the Related Art

When vehicles travel on urban roads, sometimes some models of vehicles ahead such as large or medium-sized lorries and buses block some important road surface information such as traffic lights, road signs laterally ahead and sudden road problems ahead due to excessive height, length and width of the vehicles, which imposes hidden safety risks to the travel of other vehicles, for example, at a crossing with traffic lights, when the green light turns red after the vehicle ahead passes, a rear vehicle might inadvertently run a red light because the driver cannot see the traffic light information; on a road with two lanes with one lane in each direction and without a partition in between, the blocking might cause a limited vision field to a car behind so that the car might collide with a vehicle travelling in the opposite direction when the car overtakes the vehicle ahead; in addition, in the case the driver of the vehicle ahead discovers that a road issue happens suddenly ahead and brakes the vehicle and changes the lane, the rear vehicle might be caught in an accident since it does not have enough time to respond.

In the prior art, a video collecting device may be mounted on a head and roof of the large or medium-sized lorry, and traffic conditions before and on both sides of the lorry are displayed on an array of display screens in the rear and on sides of the lorry. However, the information displayed in this manner is complicated. Furthermore, if each vehicle displays such video, the road will be made extremely messy and confused. When the driver of the rear vehicle drives the vehicle on the road, he originally needs to pay attention too much information. If he further needs to obtain desired information from the video of the vehicle ahead, this increases the burden of the driver of the rear vehicle and instead causes hidden danger to the driving safety.

BRIEF SUMMARY

Aspects of the present disclosure provide a blocked information displaying method and system for use in an autonomous vehicle, and an autonomous vehicle having the displaying system, to improve the safety performance of the vehicle on the road.

According to an aspect of the present disclosure, there is provided a blocked information displaying method for use in an autonomous vehicle, comprising obtaining information about a road ahead the autonomous vehicle and information about a rear vehicle; determining road information blocked by the autonomous vehicle, according to a positional relationship between the autonomous vehicle and the rear vehicle; and displaying the road information blocked by the autonomous vehicle to the rear vehicle.

The above aspect and any possible implementation mode further provide an implementation mode wherein the obtaining information about a road ahead the autonomous vehicle and information about a rear vehicle comprises a roof-mounted camera of the autonomous vehicle capturing images of the front of the autonomous vehicle, and a tail-mounted camera capturing images of the rear of the autonomous vehicle; and a processor of the autonomous vehicle processing the images of the front of the autonomous vehicle to obtain information about the road ahead the autonomous vehicle, including traffic signs, vehicles and obstacle information, and processing images of the rear of the autonomous vehicle to obtain information about the rear vehicle.

The above aspect and any possible implementation mode further provide an implementation mode wherein the obtaining information about a road ahead the autonomous vehicle and information about a rear vehicle comprises a laser radar on the autonomous vehicle obtaining information about vehicles and obstacles ahead of the autonomous vehicle and information about vehicle behind the autonomous vehicle.

The above aspect and any possible implementation mode further provide an implementation mode wherein the obtaining information about a road ahead the autonomous vehicle and information about a rear vehicle comprises locating and storing location information of the autonomous vehicle, the information about the road ahead the autonomous vehicle and the information about the rear vehicle.

The above aspect and any possible implementation mode further provide an implementation mode wherein the determining road information blocked by the autonomous vehicle, according to a positional relationship between the autonomous vehicle and the rear vehicle comprises judging whether the autonomous vehicle enters a blocking scenario according to preset judgement criteria.

The above aspect and any possible implementation mode further provide an implementation mode wherein the judgement criteria comprises the autonomous vehicle enters a maximum view angle range of the driver of the rear vehicle; the information about the road ahead the autonomous vehicle obtained by recognition includes traffic signs or obstacles that affect the travel of the rear vehicle; and the autonomous vehicle blocks the rear vehicle driver's sight line of seeing the road traffic signs or obstacles.

The above aspect and any possible implementation mode further provide an implementation mode wherein the displaying the road information blocked by the autonomous vehicle to the rear vehicle comprises displaying road information blocked by the autonomous vehicle to the rear vehicle via a rear side screen of the autonomous vehicle; and displaying road information blocked by the autonomous vehicle to a corresponding laterally rear vehicle via a lateral side screen of the autonomous vehicle.

The above aspect and any possible implementation mode further provide an implementation mode wherein the displaying the road information blocked by the autonomous vehicle to the rear vehicle comprises displaying the road information blocked by the autonomous vehicle to the rear vehicle in a form of words or icons.

According to another aspect of the present disclosure, there is provided a blocked information displaying system for use in an autonomous vehicle, comprising an obtaining module configured to obtain information about a road ahead the autonomous vehicle and information about a rear vehicle; a judging module configured to determine road information blocked by the autonomous vehicle, according to a positional relationship between the autonomous vehicle and the rear vehicle; and a displaying module configured to display the road information blocked by the autonomous vehicle to the rear vehicle.

The above aspect and any possible implementation mode further provide an implementation mode wherein the obtaining module is specifically configured to invoke a roof-mounted camera of the autonomous vehicle to capture images of the front of the autonomous vehicle, and invoke a tail-mounted camera to capture images of the rear of the autonomous vehicle; and invoke a processor of the autonomous vehicle to process the images of the front of the autonomous vehicle to obtain information about the road ahead the autonomous vehicle, including traffic signs, vehicles and obstacle information, and process images of the rear of the autonomous vehicle to obtain information about the rear vehicle.

The above aspect and any possible implementation mode further provide an implementation mode wherein the obtaining module is specifically configured to invoke a laser radar on the autonomous vehicle to obtain information about vehicles and obstacles ahead of the autonomous vehicle and information about the rear vehicle.

The above aspect and any possible implementation mode further provide an implementation mode wherein the obtaining module is specifically configured to locate and store location information of the autonomous vehicle, the information about the road ahead the autonomous vehicle and the information about the rear vehicle.

The above aspect and any possible implementation mode further provide an implementation mode wherein the judging module is specifically configured to judge whether the autonomous vehicle enters a blocking scenario according to preset judgement criteria.

The above aspect and any possible implementation mode further provide an implementation mode wherein the judgement criteria comprises the autonomous vehicle enters a maximum view angle range of the driver of the rear vehicle; the information about the road ahead the autonomous vehicle obtained by recognition includes traffic signs or obstacles that affect the travel of the rear vehicle; and the autonomous vehicle blocks the rear vehicle driver's sight line of seeing the road traffic signs or obstacles.

The above aspect and any possible implementation mode further provide an implementation mode wherein the displaying module is specifically configured to display road information blocked by the autonomous vehicle to the rear vehicle via a rear side screen of the autonomous vehicle; and display road information blocked by the autonomous vehicle to a corresponding laterally rear vehicle via a lateral side screen of the autonomous vehicle.

The above aspect and any possible implementation mode further provide an implementation mode wherein the displaying module is specifically configured to display the road information blocked by the autonomous vehicle to the rear vehicle in a form of words or icons.

According to a further aspect of the present disclosure, there is provided an autonomous vehicle which has the abovementioned blocked information displaying system and runs in an autonomous driving mode.

According to a further aspect of the present disclosure, there is provided a computer device, comprising a memory, a processor and a computer program which is stored on the memory and runs on the processor, the processor, upon executing the program, implementing the above-mentioned method.

According to a further aspect of the present disclosure, there is provided a computer-readable storage medium on which a computer program is stored, the program, when executed by a processor, implementing the aforesaid method.

As may be seen from the above introduction, safety performance of travel of the vehicle on the road is improved through the embodiments of the present disclosure.

BRIEF DESCRIPTION OF THE SEVERAL VIEWS OF THE DRAWINGS

To describe technical solutions of embodiments of the present disclosure more clearly, figures to be used in the embodiments or in depictions regarding the prior art will be described briefly. Obviously, the figures described below are only some embodiments of the present disclosure. Those having ordinary skill in the art appreciate that other figures may be obtained from these figures without making inventive efforts.

FIG. 1 is a flow chart of a blocked information displaying method for use in an autonomous vehicle according to an embodiment of the present disclosure.

FIG. 2 is a block diagram of a blocked information displaying system for use in an autonomous vehicle according to an embodiment of the present disclosure.

FIG. 3 illustrates a block diagram of an example computer system/server 012 adapted to implement an implementation mode of the present disclosure.

DETAILED DESCRIPTION

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

An autonomous vehicle comprises a processor, an on-roof-mounted camera, a tail camera, a rear side screen, a left rear side screen and a right rear side screen. The above devices are connected to one another via a wired or wireless network.

FIG. 1 is a flow chart of a blocked information displaying method for use in an autonomous vehicle according to an embodiment of the present disclosure. As shown in FIG. 1, the method comprises the following steps:

Step S11: obtaining information about a road ahead the autonomous vehicle and information about a rear vehicle;

Step S12: determining road information blocked by the autonomous vehicle, according to a positional relationship between the autonomous vehicle and the rear vehicle; and Step S13: displaying the road information blocked by the autonomous vehicle to the rear vehicle.

An Embodiment of an Implementation of Step S11

During the travel of the autonomous vehicle, it is necessary to sense the environment around the vehicle in real time via a sensor, and determine the location of the autonomous vehicle to realize autonomous driving.

A roof-mounted camera of the autonomous vehicle is used to capture images of the front of the autonomous vehicle, and send the image through a CAN network to a processor.

In an embodiment, the roof-mounted camera is mounted at a middle position of the top of the autonomous vehicle body, or may also be mounted in a front windshield rearview mirror of the autonomous vehicle.

In an embodiment, the roof-mounted camera is a trinocular camera, and consists of a 120-degree wide-angle monocular camera with a detection distance of 60 meters and a 30-degree main field-of-view camera binocular camera with a detection distance of 500 meters. The monocular camera is mainly used to detect category and position information of targets in a large range at a close distance, and the binocular camera is mainly used to detect a long-distance travelable area ahead the vehicle and recognize traffic signs.

In an embodiment, lane lines, traffic markings and traffic sign information in front (including side front) of the autonomous vehicle must be acquired by the camera, and vehicle and obstacle information may be obtained by a LiDAR and/or radar.

In an embodiment, the vehicle and obstacle information including speed, distance and orientation data in front of the autonomous vehicle is obtained by a 360-degree LiDAR mounted on the top of the autonomous vehicle body and/or a radar sensor such as a 24 GHz short-range radar mounted on a front bumper of the autonomous vehicle body.

In an embodiment, the processor recognizes road information such as lane lines, traffic markings, traffic signs, vehicles (including pedestrians, bicycles, motorcycles, automobiles, etc.), and obstacles (including traffic cones, deep pits, uncovered manholes, etc.) in front (including side front) of the autonomous vehicle according to the images of the front of the autonomous vehicle acquired by the roof-mounted camera.

In an embodiment, the processor may also recognize road information such as lane lines, traffic markings, traffic signs, vehicles (including pedestrians, bicycles, motorcycles, automobiles, etc.), and obstacles (including traffic cones, deep pits, uncovered manholes, etc.) in front (including side front) of the autonomous vehicle by fusing data acquired by the camera mounted on the autonomous vehicle and various sensors such as the LiDAR and radar.

In an embodiment, a coordinate system with the autonomous vehicle as a center is established to locate and store information about lane lines, traffic markings, traffic signs and obstacles in front of the autonomous vehicle obtained by recognition. In an embodiment, locating and storing information about lane lines, traffic markings, traffic signs and obstacles in front of the autonomous vehicle obtained by recognition on an electronic map comprises obtaining rough location information (with an error 1-2 m) of the autonomous vehicle according to GPS and extracting road features around the autonomous vehicle from a high-precision electronic map according to the rough location information; comparing the information about the road ahead the autonomous vehicle obtained by recognition with the road features around the autonomous vehicle extracted from the electronic map, and calculating precise location information (with an error less than 10 cm) of the autonomous vehicle; locating and storing the precise location information of the autonomous vehicle and the information about the road ahead the autonomous vehicle obtained by recognition. The electronic map is established according to a geodetic coordinate system.

A tail-mounted camera of the autonomous vehicle is used to acquire images behind the autonomous vehicle, and send the images to a processor through the CAN network, so that the processor recognizes the vehicle behind the autonomous vehicle.

In an embodiment, the tail-mounted camera is mounted at a middle position in a rear windshield of the autonomous vehicle, and is a 120-degree wide-angle monocular camera.

In an embodiment, the processor recognizes vehicles (including vehicles exactly behind the autonomous vehicle and vehicles located in left and right rear) behind (including exactly behind and in left and right rear of) the autonomous vehicle according to the images behind the autonomous vehicle acquired by the tail-mounted camera.

In an embodiment, the vehicle information including speed, distance and orientation data behind the autonomous vehicle is obtained by a 360-degree LiDAR mounted on the top of the autonomous vehicle body and/or a radar sensor such as a 24 GHz short-range radar mounted on a rear bumper of the autonomous vehicle body.

In an embodiment, the vehicle behind the autonomous vehicle obtained by recognition is located and stored in a coordinate system with the autonomous vehicle as a center according to a mutual positional relationship between the autonomous vehicle and the vehicle behind the autonomous vehicle obtained by recognition.

In an embodiment, the vehicle behind the autonomous vehicle obtained by recognition is located and stored on the electronic map according to the precise location information of the autonomous vehicle and the mutual positional relationship between the autonomous vehicle and the vehicle behind the autonomous vehicle obtained by recognition.

Through the step, the location of the autonomous vehicle, the location of the rear vehicle and road information location in front of the autonomous vehicle may be obtained under the same coordinate system to facilitate performing blocking judgment in subsequent steps.

In an Embodiment of an Implementation of Step S12

In an embodiment, judge whether the autonomous vehicle enters a scenario of blocking the rear vehicle, and trigger a blocking information synchronization function.

Wherein, judging criteria are simultaneously satisfying the following conditions:
- the autonomous vehicle enters a maximum view angle range of the driver of the rear vehicle;
- the information about the road ahead the autonomous vehicle obtained by recognition includes traffic signs (speed limit, traffic regulations, traffic lights, etc.), or obstacles that affect the travel of the rear vehicle; and the autonomous vehicle blocks the rear vehicle driver's sight line of seeing the road traffic signs or obstacles.

The above three conditions are indispensable, for example,
- if the autonomous vehicle does not enter the maximum view angle range of the driver of the rear vehicle, it certainly does not block the rear vehicle;
- if the information about the road ahead the autonomous vehicle does not include road traffic signs (speed limit, traffic regulations, traffic lights, etc.), or obstacles that affect the travel of the rear vehicle, even though the autonomous vehicle blocks the sight line of the driver of the rear vehicle, the autonomous vehicle does not affect the travel of the rear vehicle; or if the information about the road ahead the autonomous vehicle includes road traffic signs (speed limit, traffic regulations, traffic lights, etc.), or obstacles that affect the travel of the rear vehicle, but the autonomous vehicle does not block the rear vehicle driver's sight line of seeing the road traffic signs or obstacles, the autonomous vehicle does not affect the travel of the rear vehicle.

In an embodiment, the information about the road ahead the autonomous vehicle obtained in step S11 does not certainly affect the travel of the rear vehicle, so it is necessary to make judgment to extract therefrom the road traffic signs (speed limit, traffic regulations, traffic lights, etc.), or obstacles that affect the travel of the rear vehicle. The road traffic signs must be noticed in safe driving. The obstacles certainly affect the travel of the rear vehicle.

In an embodiment, judgement is made at a preset frequency to find whether the autonomous vehicle enters the blocking scenario, for example, judge one time each second. The frequency may be preset when the autonomous vehicle leaves the factory; the frequency may be adjusted dynamically according to the information about the road ahead the autonomous vehicle and the information about the rear vehicle obtained in step S11. For example, when the number included in the obtained information about the road ahead the autonomous vehicle exceeds a preset threshold, or a distance between the rear vehicle and the autonomous vehicle is smaller than a preset threshold, the judging frequency is increased.

In an Embodiment of an Implementation of Step S13

The autonomous vehicle enters the blocking scenario, triggers the blocking information synchronization function, and displays the blocked road information to the rear vehicle.

In an embodiment, the road traffic signs (speed limit, traffic regulations, traffic lights, etc.), or obstacles that affect the travel of the rear vehicle blocked by the autonomous vehicle and being invisible by the driver of the rear vehicle are displayed to the rear vehicle via a rear side screen, a left rear side screen and a right rear side screen of the autonomous vehicle.

In an embodiment, if the rear vehicle travels exactly behind the autonomous vehicle, the blocking information synchronization is performed via the rear side screen of the autonomous vehicle, to display the road traffic signs (speed limit, traffic regulations, traffic lights, etc.), or obstacles that affect the travel of the rear vehicle blocked by the autonomous vehicle and being invisible by the driver of the rear vehicle to the rear vehicle.

In an embodiment, if the rear vehicle travels laterally behind the autonomous vehicle, the blocking information synchronization is performed via the corresponding left side screen or right side screen of the autonomous vehicle, to display the road traffic signs (speed limit, traffic regulations, traffic lights, etc.), or obstacles that affect the travel of the laterally rear vehicle blocked by the autonomous vehicle and being invisible by the driver of the laterally rear vehicle to the laterally rear vehicle.

In an embodiment, the road traffic signs (speed limit, traffic regulations, traffic lights, etc.), or obstacles that affect the travel of the laterally rear vehicle blocked by the autonomous vehicle and being invisible by the driver of the laterally rear vehicle are displayed in a form of words or icons.

In an embodiment, during display, stability of the displayed content is maintained, for example, "red light 20 m ahead-read light ahead 10 m", to reduce the impact exerted by the blink of the displayed content to the driver of the rear vehicle.

In the present embodiment, the autonomous vehicle can synchronize blocked important road information in time when it blocks the sight line of the driver of the rear vehicle and prevent the rear vehicle from violation driving; meanwhile, trigger is really made only when the blocking is confirmed, which reduces excessive input of invalid information; trigger is launched purposefully for the vehicle exactly behind or laterally behind the autonomous vehicle, and conveyance of information is more direct and fast.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description belong to preferred embodiments, and the involved actions and modules are not necessarily requisite for the present disclosure.

The above introduces the method embodiment. The solution of the present disclosure will be further described through an apparatus embodiment.

FIG. 2 is a block diagram of a blocked information displaying system for use in an autonomous vehicle according to an embodiment of the present disclosure. As shown in FIG. 2, the system comprises:

an obtaining module 21 configured to obtain information about a road ahead the autonomous vehicle and information about a rear vehicle;

a judging module 22 configured to determine road information blocked by the autonomous vehicle, according to a positional relationship between the autonomous vehicle and the rear vehicle; and a displaying module 23 configured to display the road information blocked by the autonomous vehicle to the rear vehicle.

An Embodiment of an Implementation of the Obtaining Module 21

During the travel of the autonomous vehicle, it is necessary to sense the environment around the vehicle in real time via a sensor, and determine the location of the autonomous vehicle to realize autonomous driving.

The obtaining module 21 invokes a roof-mounted camera of the autonomous vehicle to capture images of the front of the autonomous vehicle.

In an embodiment, the autonomous vehicle is an autonomous vehicle having said blocked information displaying system, and the autonomous vehicle may run in an autonomous driving mode.

In an embodiment, the roof-mounted camera is mounted at a middle position of the top of the autonomous vehicle body, or may also be mounted in a front windshield rearview mirror of the autonomous vehicle.

In an embodiment, the roof-mounted camera is a trinocular camera, and consists of a 120-degree wide-angle monocular camera with a detection distance of 60 meters and a 30-degree main field-of-view camera binocular camera with a detection distance of 500 meters. The monocular camera is mainly used to detect category and position information of targets in a large range at a close distance, and the binocular camera is mainly used to detect a long-distance travelable area ahead the vehicle and recognize traffic signs.

In an embodiment, lane lines, traffic markings and traffic sign information in front (including side front) of the autonomous vehicle must be acquired by a camera, and vehicle and obstacle information may be obtained by a LiDAR and/or radar.

In an embodiment, the obtaining module 21 invokes a 360-degree LiDAR mounted on the top of the autonomous vehicle body and/or a radar sensor such as a 24 GHz short-range radar mounted on a front bumper of the autonomous vehicle body to obtain the vehicle and obstacle information including speed, distance and orientation data in front of the autonomous vehicle.

In an embodiment, the obtaining module 21 recognizes road information such as lane lines, traffic markings, traffic signs, vehicles (including pedestrians, bicycles, motorcycles, automobiles, etc.), and obstacles (including traffic cones, deep pits, uncovered manholes, etc.) in front (including side front) of the autonomous vehicle according to the images of the front of the autonomous vehicle acquired by the roof-mounted camera.

In an embodiment, the obtaining module 21 may also recognize road information such as lane lines, traffic markings, traffic signs, vehicles (including pedestrians, bicycles, motorcycles, automobiles, etc.), and obstacles (including traffic cones, deep pits, uncovered manholes, etc.) in front (including side front) of the autonomous vehicle by fusing data acquired by the camera mounted on the autonomous vehicle and various sensors such as the LiDAR and radar.

In an embodiment, a coordinate system with the autonomous vehicle as a center is established to locate and store information about lane lines, traffic markings, traffic signs and obstacles in front of the autonomous vehicle obtained by recognition.

In an embodiment, locating and storing information about lane lines, traffic markings, traffic signs and obstacles in front of the autonomous vehicle obtained by recognition on an electronic map comprises obtaining rough location information (with an error 1-2 m) of the autonomous vehicle according to GPS and extracting road features around the autonomous vehicle from a high-precision electronic map according to the rough location information; comparing the information about the road ahead the autonomous vehicle obtained by recognition with the road features around the autonomous vehicle extracted from the electronic map, and calculating precise location information (with an error less than 10 cm) of the autonomous vehicle; locating and storing the precise location information of the autonomous vehicle and the information about the road ahead the autonomous vehicle obtained by recognition. The electronic map is established according to a geodetic coordinate system.

The obtaining module 21 invokes a tail-mounted camera of the autonomous vehicle to acquire images behind the autonomous vehicle, to recognize the vehicle behind the autonomous vehicle.

In an embodiment, the tail-mounted camera is mounted at a middle position in a rear windshield of the autonomous vehicle, and is a 120-degree wide-angle monocular camera.

In an embodiment, the obtaining module 21 recognizes vehicles (including vehicles exactly behind the autonomous vehicle and vehicles located in left and right rear) behind (including exactly behind and in left and right rear of) the autonomous vehicle according to the images behind the autonomous vehicle acquired by the tail-mounted camera.

In an embodiment, the obtaining module 21 invokes a 360-degree LiDAR mounted on the top of the autonomous vehicle body and/or a radar sensor such as a 24 GHz short-range radar mounted on a rear bumper of the autonomous vehicle body to obtain the vehicle information including speed, distance and orientation data behind the autonomous vehicle.

In an embodiment, the vehicle behind the autonomous vehicle obtained by recognition is located and stored in a coordinate system with the autonomous vehicle as a center according to a mutual positional relationship between the autonomous vehicle and the vehicle behind the autonomous vehicle obtained by recognition.

In an embodiment, the vehicle behind the autonomous vehicle obtained by recognition is located and stored on the electronic map according to the precise location information of the autonomous vehicle and the mutual positional relationship between the autonomous vehicle and the vehicle behind the autonomous vehicle obtained by recognition.

The location of the autonomous vehicle, the location of the rear vehicle and road information location in front of the autonomous vehicle may be obtained under the same coordinate system to facilitate performing blocking judgment subsequently.

In an Embodiment of an Implementation of the Judging Module 22

In an embodiment, the judging module 22 judges whether the autonomous vehicle enters a scenario of blocking the rear vehicle, and triggers a blocking information synchronization function.

Wherein, judging criteria are simultaneously satisfying the following conditions:
the autonomous vehicle enters a maximum view angle range of the driver of the rear vehicle;
the information about the road ahead the autonomous vehicle obtained by recognition includes traffic signs (speed limit, traffic regulations, traffic lights, etc.), or obstacles that affect the travel of the rear vehicle; and
the autonomous vehicle blocks the rear vehicle driver's sight line of seeing the road traffic signs or obstacles.

The above three conditions are indispensable, for example:
if the autonomous vehicle does not enter the maximum view angle range of the driver of the rear vehicle, it certainly does not block the rear vehicle;
if the information about the road ahead the autonomous vehicle does not include road traffic signs (speed limit, traffic regulations, traffic lights, etc.), or obstacles that affect the travel of the rear vehicle, even though the autonomous vehicle blocks the sight line of the driver of the rear vehicle, the autonomous vehicle does not affect the travel of the rear vehicle; or
if the information about the road ahead the autonomous vehicle includes road traffic signs (speed limit, traffic regulations, traffic lights, etc.), or obstacles that affect the travel of the rear vehicle, but the autonomous vehicle does not block the rear vehicle driver's sight line of seeing the road traffic signs or obstacles, the autonomous vehicle does not affect the travel of the rear vehicle.

In an embodiment, the information about the road ahead the autonomous vehicle obtained by the obtaining module 21 does not certainly affect the travel of the rear vehicle, so it is necessary to make judgment to extract therefrom the road traffic signs (speed limit, traffic regulations, traffic lights, etc.), or obstacles that affect the travel of the rear vehicle. The road traffic signs must be noticed in safe driving. The obstacles certainly affect the travel of the rear vehicle.

In an embodiment, the judging module 22 judges at a preset frequency to find whether the autonomous vehicle enters the blocking scenario, for example, judge one time each second. The frequency may be preset when the autonomous vehicle leaves the factory; the frequency may be adjusted dynamically according to the information about the road ahead the autonomous vehicle and the information about the rear vehicle obtained by the obtaining module 21. For example, when the number included in the obtained information about the road ahead the autonomous vehicle exceeds a preset threshold, or a distance between the rear vehicle and the autonomous vehicle is smaller than a preset threshold, the judging frequency is increased.

In an Embodiment of an Implementation of the Displaying Module 23

When the autonomous vehicle enters the blocking scenario, it triggers the blocking information synchronization function, and displays the blocked road information to the rear vehicle.

In an embodiment, the displaying module 23 displays the road traffic signs (speed limit, traffic regulations, traffic lights, etc.), or obstacles that affect the travel of the rear vehicle blocked by the autonomous vehicle and being invisible by the driver of the rear vehicle to the rear vehicle via a rear side screen, a left rear side screen and a right rear side screen of the autonomous vehicle.

In an embodiment, if the rear vehicle travels exactly behind the autonomous vehicle, the blocking information synchronization is performed via the rear side screen of the autonomous vehicle, to display the road traffic signs (speed limit, traffic regulations, traffic lights, etc.), or obstacles that affect the travel of the rear vehicle blocked by the autonomous vehicle and being invisible by the driver of the rear vehicle to the rear vehicle.

In an embodiment, if the rear vehicle travels laterally behind the autonomous vehicle, the blocking information synchronization is performed via the corresponding left side screen or right side screen of the autonomous vehicle, to display the road traffic signs (speed limit, traffic regulations, traffic lights, etc.), or obstacles that affect the travel of the laterally rear vehicle blocked by the autonomous vehicle and being invisible by the driver of the laterally rear vehicle to the laterally rear vehicle.

In an embodiment, the road traffic signs (speed limit, traffic regulations, traffic lights, etc.), or obstacles that affect the travel of the laterally rear vehicle blocked by the autonomous vehicle and being invisible by the driver of the laterally rear vehicle are displayed in a form of words or icons.

In an embodiment, during display, stability of the displayed content is maintained, for example, "red light 20 m ahead-read light ahead 10 m", to reduce the impact exerted by the blink of the displayed content to the driver of the rear vehicle.

In the present embodiment, the autonomous vehicle can synchronize blocked important road information in time when it blocks the sight line of the driver of the rear vehicle and prevent the rear vehicle from violation driving; meanwhile, trigger is really made only when the blocking is confirmed, which reduces excessive input of invalid information; trigger is launched purposefully for the vehicle exactly behind or laterally behind the autonomous vehicle, and conveyance of information is more direct and fast.

In an embodiment, the present disclosure further provides an autonomous vehicle which has the abovementioned blocked information displaying system and may run in an autonomous driving mode.

In the above embodiments, embodiments are respectively described with different emphasis being placed, and reference may be made to related depictions in other embodiments for portions not detailed in a certain embodiment.

In the embodiments provided by the present disclosure, it should be understood that the revealed method and apparatus may be implemented in other ways. For example, the above-described embodiments for the apparatus are only exemplary, e.g., the division of the units is merely logical one, and, in reality, they may be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they may be located in one place, or distributed in a plurality of network units. One may select some or all the units to achieve the purpose of the embodiment according to the actual needs.

Further, in the embodiments of the present disclosure, functional units may be integrated in one processing unit, or they may be separate physical presences; or two or more units may be integrated in one unit. The integrated unit described above may be implemented in the form of hardware (circuitry), or they may be implemented with hardware plus software functional units.

FIG. 3 illustrates a block diagram of an example computer system/server 012 adapted to implement an implementation mode of the present disclosure. The computer system/server 012 shown in FIG. 3 is only an example and should not bring about any limitation to the function and scope of use of the embodiments of the present disclosure.

As shown in FIG. 3, the computer system/server 012 is shown in the form of a general-purpose computing device. The components of computer system/server 012 may include, but are not limited to, one or more processors or processing units 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 may include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 may be provided for reading from and writing to a non-removable, non-volatile magnetic media (not shown in FIG. 3 and typically called a "hard drive"). Although not shown in FIG. 3, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each drive may be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc.; with one or more devices that enable a user to interact with computer system/server 012; and/or with any devices (e.g., network card, modem, etc.) that enable computer system/server 012 to communicate with one or more other computing devices. Such communication may occur via Input/Output (I/O) interfaces 022. Still yet, computer system/server 012 may communicate with one or more networks such as a local area network (LAN), a general wide area network (WAN), and/or a public network (e.g., the Internet) via network adapter 020. As depicted in FIG. 3, network adapter 020 communicates with the other communication modules of computer system/server 012 via bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data backup storage systems, etc.

The processing unit 016 executes the functions and/or methods described in the embodiments of the present disclosure by running the program stored in the system memory 028.

The aforesaid computer program may be arranged in the computer storage medium, namely, the computer storage medium is encoded with the computer program. The computer program, when executed by one or more computers, enables one or more computers to execute the flow of the method and/or operations of the apparatus as shown in the above embodiments of the present disclosure.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium may be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still may modify technical solutions recited in the aforesaid embodiments or equivalently replace partial technical features therein; these modifications or substitutions do not make essence of corresponding technical solutions depart from the spirit and scope of technical solutions of embodiments of the present disclosure.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A blocked information displaying method for use in an autonomous vehicle, wherein the method comprises:

obtaining information about a road ahead of the autonomous vehicle and information about a rear vehicle;

determining that the autonomous vehicle has entered a scenario of blocking the rear vehicle, in response to determining that at least the following conditions are simultaneously satisfied:
  (a) the autonomous vehicle has entered a maximum view angle range of a driver of the rear vehicle,
  (b) the information about the road ahead of the autonomous vehicle, obtained by recognition, includes one or more traffic signs or obstacles that affect travel of the rear vehicle, and
  (c) the autonomous vehicle blocks the driver of the rear vehicle from seeing the one or more traffic signs or obstacles;

determining road information blocked by the autonomous vehicle from sight of the driver of the rear vehicle, according to a positional relationship between the autonomous vehicle and the rear vehicle; and displaying the road information blocked by the autonomous vehicle to the rear vehicle.

2. The method according to claim 1, wherein the obtaining information about the road ahead of the autonomous vehicle and information about the rear vehicle comprises:
  a roof-mounted camera of the autonomous vehicle capturing images of a front of the autonomous vehicle, and a tail-mounted camera capturing images of a rear of the autonomous vehicle; and
  a processor of the autonomous vehicle processing the images of the front of the autonomous vehicle to obtain information about the road ahead of the autonomous vehicle, including traffic signs, vehicles, and obstacle information, and processing images of the rear of the autonomous vehicle to obtain information about the rear vehicle.

3. The method according to claim 2, wherein the obtaining information about the road ahead of the autonomous vehicle and information about the rear vehicle further comprises:
  a laser radar on the autonomous vehicle obtaining information about vehicles and obstacles ahead of the autonomous vehicle and information about the rear vehicle.

4. The method according to claim 2, wherein the obtaining information about the road ahead of the autonomous vehicle and information about the rear vehicle further comprises:
  locating and storing location information of the autonomous vehicle, the information about the road ahead of the autonomous vehicle, and the information about the rear vehicle.

5. The method according to claim 1, wherein the displaying the road information blocked by the autonomous vehicle to the rear vehicle comprises:
  displaying road information blocked by the autonomous vehicle to the rear vehicle via a rear side screen of the autonomous vehicle; and
  displaying road information blocked by the autonomous vehicle to a corresponding laterally rear vehicle via a lateral side screen of the autonomous vehicle.

6. The method according to claim 1, wherein the displaying the road information blocked by the autonomous vehicle to the rear vehicle comprises:
  displaying the road information blocked by the autonomous vehicle to the rear vehicle in a form of one or more words or icons.

7. A computer device comprising a memory, a processor, and a computer program which is stored on the memory and runs on the processor, wherein the processor, upon executing the computer program, implements a blocked information displaying method for use in an autonomous vehicle, wherein the method comprises:
  obtaining information about a road ahead of the autonomous vehicle and information about a rear vehicle;
  determining that the autonomous vehicle has entered a scenario of blocking the rear vehicle, in response to determining that at least the following conditions are simultaneously satisfied:
    (a) the autonomous vehicle has entered a maximum view angle range of a driver of the rear vehicle,
    (b) the information about the road ahead of the autonomous vehicle, obtained by recognition, includes one or more traffic signs or obstacles that affect travel of the rear vehicle, and
    (c) the autonomous vehicle blocks the driver of the rear vehicle from seeing the one or more traffic signs or obstacles;
  determining road information blocked by the autonomous vehicle from sight of the driver of the rear vehicle, according to a positional relationship between the autonomous vehicle and the rear vehicle; and
  displaying the road information blocked by the autonomous vehicle to the rear vehicle.

8. A non-transitory computer-readable storage medium on which a computer program is stored, wherein the computer program, when executed by a processor, implements a blocked information displaying method for use in an autonomous vehicle, wherein the method comprises:
  obtaining information about a road ahead of the autonomous vehicle and information about a rear vehicle;
  determining that the autonomous vehicle has entered a scenario of blocking the rear vehicle, in response to determining that at least the following conditions are simultaneously satisfied:
    (a) the autonomous vehicle has entered a maximum view angle range of a driver of the rear vehicle,
    (b) the information about the road ahead of the autonomous vehicle, obtained by recognition, includes one or more traffic signs or obstacles that affect travel of the rear vehicle, and
    (c) the autonomous vehicle blocks the driver of the rear vehicle from seeing the one or more traffic signs or obstacles;
  determining road information blocked by the autonomous vehicle from sight of the driver of the rear vehicle, according to a positional relationship between the autonomous vehicle and the rear vehicle; and
  displaying the road information blocked by the autonomous vehicle to the rear vehicle.

9. The computer device according to claim 7, wherein the obtaining information about the road ahead of the autonomous vehicle and information about the rear vehicle comprises:
  a roof-mounted camera of the autonomous vehicle capturing images of a front of the autonomous vehicle, and a tail-mounted camera capturing images of a rear of the autonomous vehicle; and
  a processor of the autonomous vehicle processing the images of the front of the autonomous vehicle to obtain information about the road ahead of the autonomous vehicle, including traffic signs, vehicles, and obstacle information, and processing images of the rear of the autonomous vehicle to obtain information about the rear vehicle.

10. The computer device according to claim 9, wherein the obtaining information about the road ahead of the autonomous vehicle and information about a rear vehicle further comprises:
    a laser radar on the autonomous vehicle obtaining information about vehicles and obstacles ahead of the autonomous vehicle and information about the rear vehicle.

11. The computer device according to claim 9, wherein the obtaining information about the road ahead of the autonomous vehicle and information about the rear vehicle further comprises:
    locating and storing location information of the autonomous vehicle, the information about the road ahead of the autonomous vehicle, and the information about the rear vehicle.

12. The computer device according to claim 7, wherein the displaying the road information blocked by the autonomous vehicle to the rear vehicle comprises:
    displaying the road information blocked by the autonomous vehicle to the rear vehicle in a form of one or more of words or icons.

13. The non-transitory computer-readable storage medium according to claim 8, wherein the obtaining information about the road ahead of the autonomous vehicle and information about the rear vehicle comprises:
    a roof-mounted camera of the autonomous vehicle capturing images of a front of the autonomous vehicle, and a tail-mounted camera capturing images of a rear of the autonomous vehicle; and
    a processor of the autonomous vehicle processing the images of the front of the autonomous vehicle to obtain information about the road ahead of the autonomous vehicle, including traffic signs, vehicles, and obstacle information, and processing images of the rear of the autonomous vehicle to obtain information about the rear vehicle.

14. The non-transitory computer-readable storage medium according to claim 13, wherein the obtaining information about the road ahead of the autonomous vehicle and information about the rear vehicle further comprises:
    a laser radar on the autonomous vehicle obtaining information about vehicles and obstacles ahead of the autonomous vehicle and information about the rear vehicle.

15. The non-transitory computer-readable storage medium according to claim 13, wherein the obtaining information about the road ahead of the autonomous vehicle and information about the rear vehicle further comprises:
    locating and storing location information of the autonomous vehicle, the information about the road ahead of the autonomous vehicle and the information about the rear vehicle.

16. The non-transitory computer-readable storage medium according to claim 8, wherein the displaying the road information blocked by the autonomous vehicle to the rear vehicle comprises:
    displaying the road information blocked by the autonomous vehicle to the rear vehicle in a form of one or more of words or icons.

\* \* \* \* \*